UNITED STATES PATENT OFFICE.

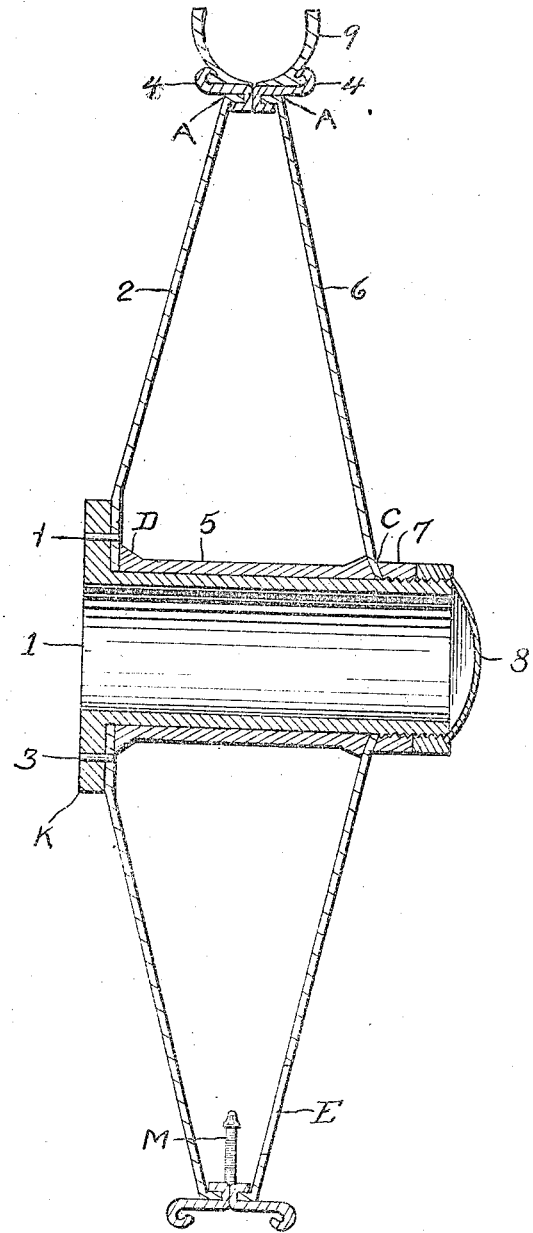

JESSE D. LANGDON AND MARIE V. BURBANK LANGDON, OF WATERVILLE, WASHINGTON, ASSIGNORS OF ONE-HALF TO ERWIN GREER, OF CHICAGO, ILLINOIS.

SEPARABLE WHEEL.

1,301,716.  Specification of Letters Patent.  Patented Apr. 22, 1919.

Application filed September 5, 1917. Serial No. 189,763.

*To all whom it may concern:*

Be it known that we, JESSE D. LANGDON and MARIE V. BURBANK LANGDON, both citizens of the United States, residing at Waterville, in the county of Douglas and State of Washington, have invented certain new and useful Improvements in Separable Wheels; and we do hereby declare the following to be a full, clear, and exact description of the invention, such as will enable others skilled in the art to which it appertains to make and use the same.

This invention relates to a separable wheel and particularly to a structure wherein the side members of the wheel are adapted to be clamped upon a hub and support a tire retaining means at their outer periphery.

The invention has for an object to provide a novel and improved construction comprising a hub having a flange at one end in contact with which a side member of the wheel is clamped by means of a collar mounted upon said hub, the opposite side member being clamped in contact with the outer end of said collar.

Other and further objects and advantages will be hereinafter set forth and the novel features thereof defined by the appended claim.

The drawing shows a transverse central section through the wheel.

The numeral 1 designates the hub having at its inner end a flange K against which the inner side member of the wheel is held against rotation by means of studs 3. The side member 2 of the wheel is clamped in position by means of the sleeve 5 mounted upon the hub, the outer end of which is beveled at an angle to the axis of the hub. The outer side member 6 is clamped in contact with this beveled surface by means of a nut 7 threaded upon the hub, said nut being preferably locked in position by means of a dust cap 8 threaded on the hub end beyond the nut 7. The inner face C of the nut 7 is beveled to correspond with the inclined end of the sleeve, so that the outer side member of the wheel is thus firmly clamped in position and centered at the proper angle. This member 6 is also provided with a suitable opening E by which access is secured to the valve stem M for convenience in inflating the tire O.

The periphery of each of the side members 2 and 6 is formed with inwardly extending lips A, A, adapted to seat in corresponding recesses carried by the opposite members 4, 4, of the tire retaining rim.

In the assembling of the wheel, it will be seen that the inner side member is first placed in contact with the flange of the hub where it is held against rotative movement, the sleeve then brought in contact with said member and the outer side member disposed between the inclined faces of the hub and lock nut. Before these parts are clamped in position, the rim members carrying the tire are introduced between the inturned flanges of the side members, so that when the clamp and lock nuts are adjusted, all of the parts of the wheel are brought into proper alinement and rigidly held against side thrust or strain. The parts may also be quickly disassembled when desired, as the construction eliminates practically all bolts or rivets and greatly decreases the cost of manufacture.

While a particular construction and configuration of wheel has been herein shown, the invention is not specifically confined thereto, the novel features thereof being set forth in the following claims.

What we claim is:—

In a separable wheel, a hub provided with a flange at one end, a side member engaging said flange and provided at its outer end with an angularly disposed peripheral flange, means for retaining said side member in contact with the hub flange, an outer side member adapted to engage the outer end of said means and provided with an angularly disposed peripheral flange at its outer end, means for clamping said outer side member in position, and a tire rim comprising coöperating separable members having peripherally extending angular seats upon the under face thereof adapted to receive the flanges of said side members.

In testimony whereof we have signed our names to this specification in the presence of two subscribing witnesses.

JESSE D. LANGDON.
MARIE V. BURBANK LANGDON.

Witnesses:
F. J. STEWART,
G. W. FRALEY.